United States Patent
Weiss

[15] 3,677,540
[45] July 18, 1972

[54] MATERIAL DISCHARGE CONTROL APPARATUS

[72] Inventor: Paul C. Weiss, Evanston, Ill.
[73] Assignee: Ambac Industries Incorporated, Garden City, N.Y.
[22] Filed: April 21, 1969
[21] Appl. No.: 817,837

[52] U.S. Cl. ............................222/23, 222/63, 222/76, 222/178, 222/283, 239/677, 239/678
[51] Int. Cl. ...........................................................B67d 5/08
[58] Field of Search.................222/178, 63, 334, 23, 52, 76, 222/283, 310, 317, 504; 239/672, 677, 678

[56] References Cited

UNITED STATES PATENTS

| | | |
|---|---|---|
| 3,398,861 | 8/1968 | Ulrich....................222/178 X |
| 3,511,411 | 5/1970 | Weiss......................222/178 X |

*Primary Examiner*—Robert B. Reeves
*Assistant Examiner*—Frederick R. Handren
*Attorney*—Charles B. Cannon

[57] ABSTRACT

Discharge of material from the hopper of a vehicular spreader is determined by the opening of the hopper gate and the speed of the conveyor or auger feed mechanism. By interrelating the apparatus for controlling the gate with the apparatus for regulating the feed mechanism the engine or motor driving the latter can be caused to operate within its optimum range. The gate position can be controlled automatically or manually; in the latter case the operator is provided with an appropriate signal defining the optimum range. The apparatus is also ground speed responsive for maintaining a constant selectable discharge rate.

16 Claims, 5 Drawing Figures

3,677,540

MATERIAL DISCHARGE CONTROL APPARATUS

The present invention relates to apparatus for controlling the discharge of material from a reservoir.

In the diverse fields of highway maintenance and agriculture there is a need for equipment capable of accurately discharging and spreading granular or particulate material. In highway maintenance such material may take the form of salt or sand for ice and snow control; while in agriculture the material may be fertilizer or herbicides or the like.

In my application entitled "VEHICULAR MATERIAL SPREADER CONTROL APPARATUS" filed contemporaneously with the present application there is described an arrangement wherein the system for spreading the particulate material is interconnected with the dispensing system to automatically adjust the dispensing rate concomitantly with any adjustment in width of spread to maintain constant the spreading density. In one embodiment described in the aforesaid application the feeding mechanism for dispensing and the spinner are driven by the same prime mover and the dispensing rate is further controlled by a speed regulated hopper gate. In a further embodiment described therein the speed control circuit for the spinner motor is interconnected with a hopper gate while the feeding mechanism is independently controlled.

The present invention is directed primarily to the apparatus for controlling the discharge of material with the object of expanding the range of control available and of providing for optimum utilization of the prime mover or speed regulatable driver for the feed mechanism. While not specifically mentioned hereinafter, it is to be understood that suitable spreading equipment will generally be used with the discharge controlling apparatus.

One of the objects of the present invention is to provide for better operation and utilization of the hopper gate in controlling the discharge of material.

Another object of the present invention is to provide a system which makes maximum utilization of the available discharge determining components on conventional highway maintenance vehicles and agricultural implements.

A still further object of the invention is to enable the motive means to be operated within an optimum speed range.

In accordance with one aspect of the present invention there is provided apparatus for controlling the operation of a vehicular material spreader of the type having a reservoir from which material is dispensed at a rate determined by at least two interdependent discharge determining components having respective means for regulating a corresponding discharge determining characteristic thereof, wherein the apparatus comprises in combination: means for sensing the ground speed of the vehicular spreader, means for sensing the prevailing discharge determining characteristics of the two components, a control circuit responsive to both of the sensing means for effecting as a function of change in ground speed an adjustment of one of the means for regulating a discharge determining characteristic, and means for adjusting the other of the regulating means for maintaining the operation of the one regulating means within a desired range.

In accordance with another aspect of the present invention there is provided a method of operating a vehicular spreader of the aforesaid type from which the discharge of material is controlled by both the positioning of a gate and the regulation of the speed of a feed mechanism which comprises the steps of regulating the speed of the feed mechanism in a particular relation to the ground speed of the spreader for discharging material at a selected rate, and regulating the position of the gate while reciprocally controlling the relation between the speed of the feed mechanism and the ground speed to maintain the same selected discharge rate with a different feed mechanism speed.

Other aspects and objects of the invention will be apparent to those skilled in the art after reading the following detailed description of certain presently preferred embodiments thereof with reference to the appended drawings wherein.

Throughout the figures of the drawings the same reference numerals are used to designate the same or similar parts.

Figure 1:
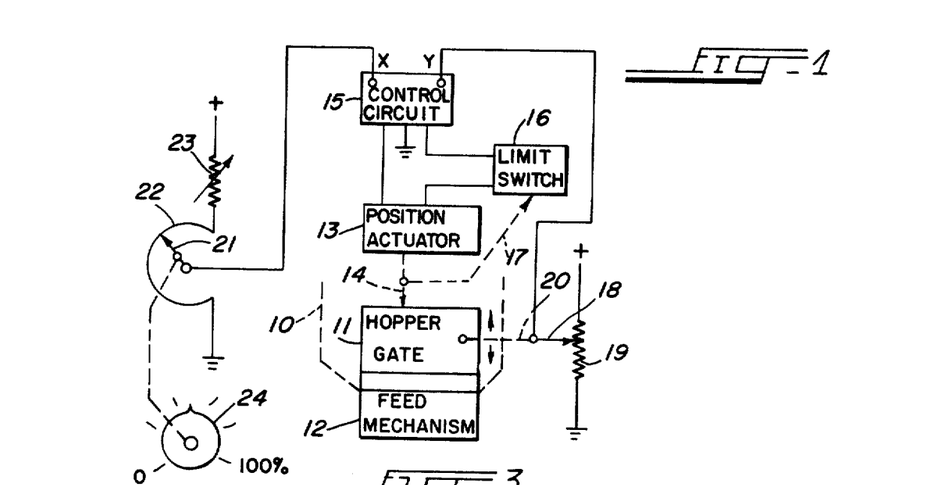
FIG. 1 is a schematic diagram of a remote servo type control system for a hopper gate.

Reference should now be had to FIG. 1 wherein a reservoir, designated generally by the numeral 10, is shown with its output controlled by a hopper gate 11 and a feed mechanism 12. The feed mechanism 12 may take the form of a motor driven conveyor or auger of conventional type.

In order to position the hopper gate 11, there is provided a position actuator 13 which is coupled to the gate by a connection 14. For the purpose of the present discussion, it can be assumed that the position actuator is an electrically operable motor which determines the position of the hopper gate through the intermediary of suitable mechanical linkage 14. Actuating current for the position actuator 13 is supplied by a control circuit 15 which is coupled to the actuator 13 in series with a limit switch 16. The output 14 from the actuator 13 is interconnected mechanically with the limit switch 16 by the connection 17.

The details of construction of the control circuit 15 and limit switch 16 form no part of the present invention and are described fully in the copending application mentioned above. Basically, the control circuit 15 includes a differential amplifier arrangement which, in response to signals at the two inputs designated X and Y, controls a pair of output relays for controlling, in turn, the application of current to the actuator 13 through the limit switch 16 with one or the other polarity to operate the actuator in one or the other direction.

The Y input for the control circuit 15 is provided by a connection to the slider 18 of a potentiometer 19 connected between ground and a source of positive potential (not shown). Hereinafter, whenever reference is made to a source of positive potential it can be assumed to be the usual battery or generator voltage available from the vehicle electrical system. The slider 18 is mechanically joined to the hopper gate 11 by a connection designated by the numeral 20 such that its position is controlled by the position of the gate.

The X input of the control circuit 15 is obtained by a connection to the slider 21 of a potentiometer 22 which may be linear or non-linear as desired or of the switched resistor type as employed in the embodiments described in the aforementioned copending application. One end of potentiometer 22 is connected to ground while the other end is connected through an adjustable resistor 23 to the source of positive voltage. A calibrated knob 24 manipulable by the operator is interconnected with the slider 21.

It is to be understood that so long as the potential appearing at input terminals X and Y are substantially equal both outputs from the control circuit 15 will be grounded and the position actuator 13 will be deenergized. When an unbalance develops at the input terminals to the control circuit 15 due to repositioning of the slider 21, the position actuator 13 will be energized to adjust the hopper gate thereby repositioning the slider 18 on potentiometer 19 until the potentials at the inputs X and Y of circuit 15 resume balance. The control knob 24 may be calibrated in percentage of gate opening, as shown in the drawing by way of illustration, or it might be calibrated in terms of inches of opening or in other suitable terms.

As described in the aforesaid copending application, the position actuator 13 responds under control of the circuit 15 until limiting conditions determined by the limit switch 16 are reached. At such time the limit switch opens the circuit to the position actuator preventing further operation in the limited direction. The limit switch is polarity sensitive and limits operation at both ends of a selected range.

In a simple system as shown in FIG. 1, wherein the feed mechanism may be driven at a constant rate while control is obtained exclusively through positioning of the gate 11, the gate may be arranged to close completely. However, where the feed mechanism can be stopped at will, it has been found desirable for practical reasons to limit the minimum opening at about 5 percent of full opening. On a typical highway maintenance truck the gate may have a range of movement of about 6 inches such that a 5 percent opening represents an opening of about 0.3 inches. While this opening is not sufficient to permit the usual particulate materials to fall out of the gate opening with the feed mechanism at a standstill, it is sufficient to provide for a small discharge when the feed mechanism 12 is operating.

Figure 2:
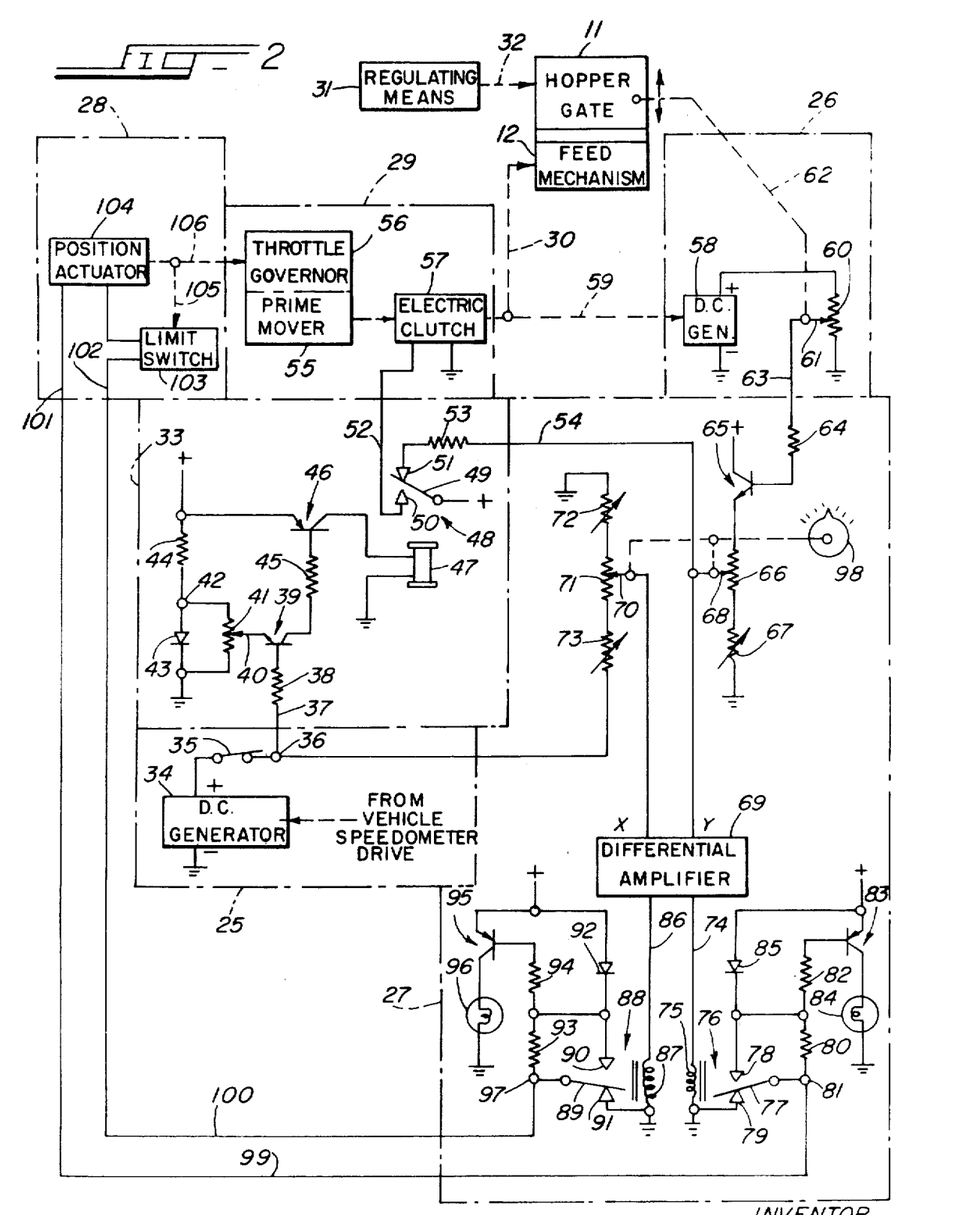
FIG. 2 is a schematic diagram of a system for controlling both the feed mechanism and the hopper gate in accordance with the invention.

Referring now to FIG. 2, there is shown apparatus for dispensing material under the mutual control of the adjustable gate 11 and the adjustable speed feed mechanism 12. The apparatus comprises in combination a ground speed sensor shown within the phantom outline box 25 for sensing the ground speed of a vehicular spreader (not shown). A speed and position sensor shown within the box 26 is provided for sensing the speed of the feed mechanism 12 and the position of the gate 11 in a manner to be described. A control circuit within a box 27 is responsive to all of the sensing means included within the boxes 25 and 26 for controlling the regulating means shown within the box 28. The regulating means 28 controls the speed of a speed regulatable driver within the box 29 which is coupled over a path 30 in driving relationship to the feed mechanism 12. Further regulating means 31 is connected over the path 32 to the hopper gate 11. An engagement circuit within the box 33 is interconnected with the ground speed sensor 25, the control circuit 27 and the speed regulatable driver 29 for a purpose which will be described below.

The ground speed sensor 25 includes a DC generator 34 operatively interconnected with the vehicle speedometer drive or other convenient drive point in the vehicle. The negative terminal of the generator is shown connected to ground while the positive terminal is connected through a RUN-STOP switch 35 to an output terminal 36. Thus, there is provided at terminal 36 a voltage proportional to the ground speed of the vehicle. This voltage is applied over a connection 37 to a control input for the engagement circuit 33. The connection 37 leads through a resistor 38 to the base electrode of an N-P-N transistor 39 whose emitter is connected to the slider 40 of a potentiometer 41. The resistance element of the potentiometer 41 is connected on the one hand to ground and on the other hand to the junction 42 between a constant voltage rectifier 43 and a resistor 44. The free end of resistor 44 is connected to the positive terminal of the source of voltage.

The collector electrode of transistor 39 is connected through a resistor 45 to the base electrode of a P-N-P transistor 46. The emitter of transistor 46 is connected to the source of voltage while its collector is connected to ground through the winding 47 of relay 48. The relay 48 includes an armature 49 under the control of winding 47. Armature 49 is connected to the source of positive voltage, as shown. Cooperating with the armature 49 are two fixed contacts 50 and 51. Contact 50 is connected through a lead 52 from one output of the engagement circuit 33 to an input of the speed regulatable driver 29. The other contact 51 is connected through a resistor 53 to a second output of the engagement circuit 33 from which a lead 54 provides a connection to an input of the control circuit 27.

In the embodiment of FIG. 2 the speed regulatable driver 29 includes a prime mover 55 whose speed is controlled by a throttle device provided with a throttle control 56. Typically, the prime mover 55 may be an internal combustion engine while the throttle control 56 is a suitable governor. The output from the prime mover 55 is coupled through an electric clutch 57 to the drive path 30 which operates the feed mechanism 12. As shown in the drawing, the electric clutch has a grounded terminal and a terminal connected to the lead 52 from the engagement circuit 33.

The speed and position sensor 26 includes a DC generator 58 operatively connected to the output from the electric clutch 57 in the speed regulatable driver 29 by means of a mechanical connection 59. Thus, the generator 58 is driven at a speed proportional to the speed of the feed mechanism 12. The negative terminal of generator 58 is connected to ground while the positive terminal is connected through the resistance element of a potentiometer 60 to ground. The potentiometer 60 has a slider 61 mechanically interconnected over the connection 62 to the hopper gate 11 such that the position of slider 61 is determined by the position of the hopper gate. The slider 61 is electrically connected to a lead 63 interconnecting an output from the speed and position sensor 26 to another input of the control circuit 27.

The lead 63, entering the control circuit 27, is connected through a resistor 64 to the base electrode of an N-P-N transistor 65. The collector electrode of transistor 65 is connected to the positive source of voltage while the emitter electrode thereof is connected to ground through a voltage divider consisting of the potentiometer 66 and the adjustable resistor 67. Potentiometer 66 is provided with a slider 68 which is electrically connected both to the lead 54 coming from the engagement circuit 33 and to the Y input of a differential amplifier 69.

The X input of the differential amplifier 69 is electrically connected to a slider 70 of a potentiometer 71 which forms a part of a voltage divider including adjustable resistors 72 and 73 connected between ground and the output terminal 36 of the ground speed sensor 25.

For the details of construction of differential amplifier 69, reference should be had to the copending application referred to above. The amplifier 69 has one output 74 connected through the winding 75 of a relay 76 to ground. Relay 76 has an armature 77 and fixed contacts 78 and 79. Contact 79 is connected to ground while contact 78 is connected through a resistor 80 to the armature 77. The junction between resistor 80 and armature 77 represents a first output terminal 81 for the circuit 27. The junction between resistor 80 and contact 78 is connected through a resistor 82 to the base electrode of a P-N-P transistor 83 whose emitter is connected to the positive terminal of the voltage source and whose collector is connected through a signal lamp 84 to ground. The positive terminal of the source is also connected to the anode of a diode 85 whose cathode is connected to the contact 78.

The differential amplifier 69 has a second output 86 coupled through a winding 87 of a relay 88 to ground. Relay 88 includes an armature 89 and fixed contacts 90 and 91. The contacts 90 is connected to the cathode of a diode 92 whose anode is connected to the positive terminal of the voltage source. Contact 90 is also connected through a resistor 93 to armature 89 and through a resistor 94 to the base electrode of a P-N-P transistor 95. The emitter electrode of transistor 95 is connected to the source of positive potential while the collector electrode is connected through a signal lamp 96 to ground. The junction 97 between resistor 93 and armature 89 represents a second output terminal for circuit 27.

Manual adjustment of the circuit 27 is provided by a control knob 98 mechanically interconnected with both sliders 68 and 70 for conjoint operation thereof. As slider 68 advances towards the low potential end of its potentiometer, slider 70 is advanced toward the high potential end of its potentiometer and vice versa. The output terminal 81 and 97 of circuit 27 are interconnected by leads 99 and 100, respectively, with the input points 101 and 102 of the regulating means 28.

The input point 102 of regulating means 28 is connected through a limit switch 103 to one input of a position actuator 104, the other input of actuator 104 being connected to input point 101. Position actuator 104 may be an electric motor having its output shaft connected over a first connection 105 to the limit switch 103 and over a second connection 106 to the throttle control 56 in the speed regulatable driver 29.

In order to linearize the scale associated with the knob 98 in the control circuit 27, the potentiometers 66 and 71 may be provided with a non-linear characteristic as described in copending application Ser. No. 689,503 filed Dec. 11, 1967, entitled "SPEED CONTROL." As explained in application No. 689,503, if the potentiometers 66 and 71 both have an approximately square law characteristic and if the resistors 67 and 72 are adjusted such that each has a resistance value equal to 46.2 percent of the total resistance of the associated potentiometers 66 and 71, respectively, the discharge rate from minimum to maximum of the equipment can be varied to the approximate ratio of 1:10. At the same time, the output from the speed and position sensor 26 will be caused to vary linearly with adjustment of the knob 98 for any given output from the ground speed sensor 25. The overall material delivery range is adjusted by variable resistor 73.

In order to explain the operation of the system of FIG. 2, assume that the hopper gate 11 is closed to its minimum position (5 percent opening), the feed mechanism 12 is halted, and the vehicle is at a standstill. The output from generator 34 will be zero.

In the engagement circuit 33 current flowing through the resistor 44 and diode 43 establishes a stable voltage of approximately 0.7 volts at the junction 42 which is applied to the potentiometer 41. A selected percentage of this voltage is applied to the emitter electrode of transistor 39 for biasing the latter. With zero voltage at the output terminal 36 of the speed sensor 25, the transistor 39 will be non-conductive maintaining transistor 46 in a non-conductive state. Thus, relay 48 will be deenergized and its armature 49 will engage contact 51 as shown in the drawing. This applies the full positive voltage from the voltage source through resistor 53 to the slider 68 of potentiometer 66 and to the Y input of differential amplifier 69.

As previously mentioned, the voltage at the output terminal 36 of the speed sensor 25 is zero. Therefore, zero voltage will be applied to the X input of amplifier 69. The arrangement of the amplifier 69 is such that this imbalance at its inputs results in the energization of its output relay 88 causing armature 89 to leave contact 91 and engage contact 90. However, armature 77 of relay 76, which is deenergized, remains in engagement with grounded contact 79. A circuit can now be traced from the positive terminal of the voltage source through diode 92, contact 90, armature 89, lead 100, input point 102 of the regulating means 28, and the limit switch 103 to one side of the position actuator 104. The other side of the position actuator 104 is connected through output point 101 to lead 99 and by way of terminal 81 through armature 77 and contact 79 to ground. If limit switch 103 is not at a limiting position for the polarity involved, current flows through position actuator 104 to rotate it in a direction which adjusts the throttle control 56 in the speed regulatable driver 29 to its idle position. At this point the limit switch 103 opens to prevent further movement of the actuator 104 in the same direction.

Since the circuit which supplies current to it through contact 50 of relay 48 in the engagement circuit 33 is broken, the electric clutch 57 is deenergized. Therefore, both the feed mechanism 12 and the generator 58 in the speed and position sensor 26 are at a standstill although the prime mover 55 is idling. Zero voltage is present at the slider 61 of potentiometer 60 and, therefore, the transistor 65 is nonconductive. Hence, the only voltage appearing at the Y input of differential amplifier 69 is that obtained from the voltage source through the armature 49 of relay 48. As explained above, this maintains an imbalance at the input to the amplifier 69 maintaining relay 88 energized.

Assuming that the RUN-STOP switch 35 is closed, the operator can start his vehicle causing generator 34 to be driven so as to develop a voltage at its output terminal 36. When the voltage at terminal 36 exceeds the voltage at the slider 40 of potentiometer 41, the transistor 39 will be rendered conductive. This permits transistor 46 to conduct and energize relay 48. Upon its energization, relay 48 causes its armature 49 to leave contact 51 and engage contact 50. This action removes the overriding bias from the Y input of differential amplifier 69 and completes a circuit for energizing the electric clutch 57. Both the feed mechanism 12 and generator 58 commence operation at the idling speed of prime mover 55, or some related speed depending upon any speed changing linkage between the components.

As the vehicle gains speed, the voltage at the output of generator 34 will increase applying increased voltage to the X input of amplifier 69. When this voltage matches the voltage at the Y input, relay 88 will be deenergized to the position shown in the drawing. When the voltage at the X input exceeds the voltage at the Y input of amplifier 69, the relay 76 will be energized causing its armature 77 to leave contact 79 and engage contact 78. With this change in condition, a circuit can be traced which applies voltage to the position actuator 104 of opposite polarity to that which was applied in the previous discussion when relay 88 was energized. The limit switch 103 is of a type which becomes open circuited at its respective limits for only one direction of current flow and not for the other. Hence, there is now a completed circuit for operating position actuator 104 in a direction to open the throttle control 56 increasing the speed of prime mover 55. This results in increased speed of operation of the feed mechanism 12 and of the generator 58. Increased voltage will be applied through the potentiometer 60 to the transistor 65. Transistor 65 will conduct and amplify this voltage applying it to the voltage divider consisting of potentiometer 66 and resistor 67. The speed of the prime mover and the feed mechanism 12 will be increased until the voltage applied to the Y input of amplifier 69 becomes substantially equal to the voltage appearing at its X input. At this time relay 76 will become deenergized.

Within a predetermined range of vehicle operating speed, the speed of operation of the feed mechanism 12 will be maintained in a selected functional relationship thereto depending upon the selected position of control knob 98. Up to this point no mention has been made of the use of the hopper gate 11. As the vehicle gains speed the position actuator 104 is advanced in a direction to increase the speed of the prime mover. Eventually, if the vehicle speed continues to increase, the position actuator will reach a point where the limit switch 103 opens. The switch 103 may be arranged to open when the prime mover 55 attains a selected maximum speed.

If the vehicle continues to operate at a speed such that the voltage at the X input of differential amplifier 69 remains greater than the voltage at its Y input, relay 76 will be maintained energized although limit switch 103 is open circuited. It will now be observed that a closed circuit exists from the positive terminal of the voltage source through diode 85 and resistor 82 to the base electrode of transistor 83. The junction between diode 85 and resistor 82 is connected to the position actuator 104 and limit switch 103, but the latter is open circuited. Hence, the potential at the base electrode of transistor 83 will be approximately equal to the potential at its emitter electrode causing the transistor 83 to be non-conductive and the signal lamp 84 to be extinguished.

When the lamp 84 is extinguished, it indicates to the operator that he has one of two courses of action to follow. He can either slow down his vehicle reducing the output from generator 34 and thereby the voltage at the X input of amplifier 69, or he can open the hopper gate 11 by means of the regulating means 31. When the hopper gate 11 is opened it advances slider 61 on potentiometer 60 away from its grounded terminal. This increases the proportion of the voltage developed by generator 58 which is supplied through transistor 65 to potentiometer 66. When the gate 11 is opened sufficiently the voltage applied to the Y input of differential amplifier 69 will be sufficient to deenergize relay 76. With further opening of the gate 11, the potential at the Y input will exceed that at the X input of amplifier 69 causing relay 88 to energize and rotate the position actuator 104 in the throttle closing direction.

As soon as relay 76 becomes deenergized the armature 77 engages contact 79 completing a circuit from the voltage source through diode 85 and resistor 80 to ground. The voltage drop across the diode 85 which may be considered an impedance element is applied through resistor 82 to the base electrode of transistor 83 causing that transistor to become conductive and illuminate lamp 84.

Even when relay 76 is energized causing its armature to engage the ungrounded contact 78, sufficient current will flow through diode 85 and the position actuator 104 to maintain the transistor 83 conductive and illuminating lamp 84. It should be apparent that relay 88 and lamp 96 operate in similar fashion. Thus, it can be seen that the signal lamps 84 and 96 are maintained illuminated for all normal operation of the relays 76 and 88. Only upon the occurrence of a relay being energized calling for movement of the position actuator 104 in a direction beyond the open circuit condition of the limit switch 103 will the associated transistor be deenergized and the associated lamp extinguished. Lamp 84 which may be green in color goes out when the prime mover has reached its maximum speed and lamp 96 which may be red in color goes out when the prime mover has attained its limiting minimum speed.

The regulating means 31 may take any suitable form for manipulating the hopper gate 11; e.g., a direct mechanical linkage, a toggle switch controlled electric actuator or preferably a remote actuating circuit of the type shown in FIG. 1. In the latter case, the output 32 from the regulating means would be replaced by the output 14 from the position actuator in FIG. 1. The slider 18 of potentiometer 19 in FIG. 1 would be operated in tandem with the slider 61 of potentiometer 60 in FIG. 2 through their respective connections to the hopper gate 11. Whatever the regulating means, in this embodiment the operator determines the adjustment of the hopper gate as dictated by the condition of the lamps 84 and 96.

When the vehicle is operating and the operator wishes to stop the discharge mechanism without stopping the forward speed of the vehicle, he can open the RUN-STOP switch 35. This removes the voltage from the ground speed sensor 25 which is applied from its output terminal 36 to both the engagement circuit 33 and the control circuit 27. The engagement circuit 33 will be deenergized causing the relay 48 to drop out disengaging electric clutch 57 and applying the full positive voltage from the source through resistor 53 to the Y input of amplifier 69. This results, as previously described, in the speed of the prime mover 55 being reduced to idling. Independently, of course, the operator must close the hopper gate 11 to eliminate spillage from the opening in spite of the inoperative condition of feed mechanism 12.

Figure 3:
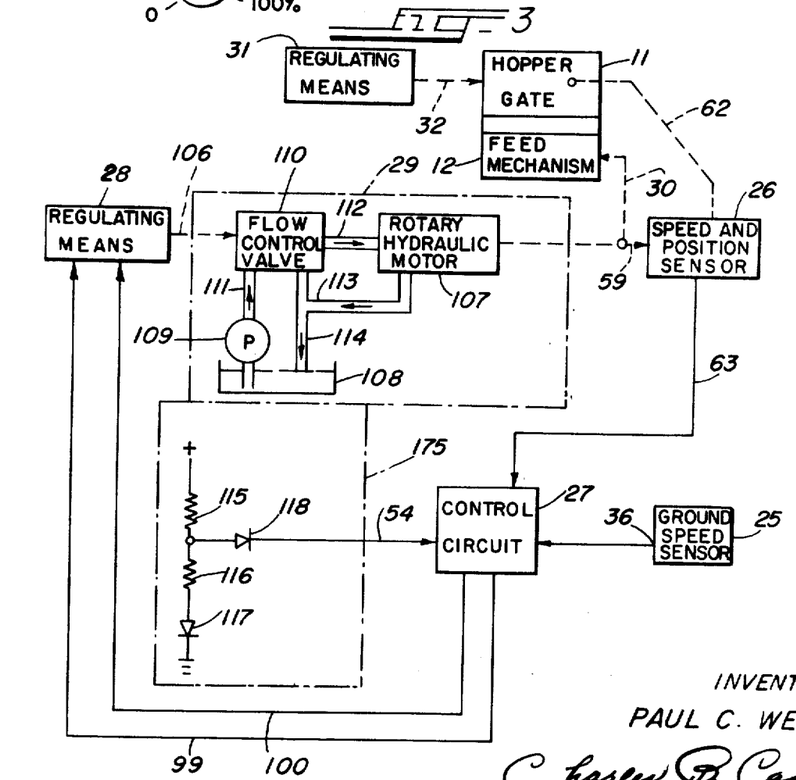
FIG. 3 is a schematic diagram showing a modification of the system of FIG. 2.

The embodiment described with reference to FIG. 2 makes use of a prime mover such as an internal combustion engine or the like. Because of the ready availability of hydraulic power on a spreading vehicle the system shown in FIG. 3 may be found preferable. The system shown in FIG. 3 is substantially the same as that shown in FIG. 2 except for a difference in the speed regulatable driver 29 and a replacement for the engagement circuit 33. Thus, driving power for the feed mechanism 12 is obtained from a rotary hydraulic motor 107 receiving operating fluid from a reservoir 108. The fluid from the reservoir is pressurized by a pump 109 which feeds a flow control valve 110 through an inlet conduit 111. A conduit 112 interconnects the valve 110 with an inlet to the motor 107. Return fluid from the motor 107 is conducted through a conduit 113 to a return flow pipe or conduit 114. There is also a connection to the return conduit 114 from the flow control valve 110. This latter connection represents a bypass for fluid. Preferably, the flow control valve is of the pressure compensated flow regulator type and may be constructed as shown in the above mentioned application Ser. No. 689,503.

Depending upon choice of limits selected for the limit switch within the regulating means 28, the flow control valve 110 can be manipulated between selected minimum and maximum flow conditions. With the illustrated hydraulic control it is possible to completely close the flow control valve 110 so as to bring motor 107 to a standstill. Thus, it is not necessary to employ a clutch mechanism as employed in the FIG. 2 embodiment. Instead, use may be made of the circuit shown in the outline box 175 for determining the minimum ground speed at which the feed mechanism commences operation.

As seen in the drawing, two resistors designated 115 and 116 are connected in series with a constant voltage diode 117 between the source of positive potential and ground. The junction between resistors 115 and 116 is connected to the anode of a diode 118 whose cathode is connected to the output lead 54 which leads to the Y input of the differential amplifier 69 within the control circuit 27 as seen in FIG. 2. The arrangement is such that a very low voltage, for example 0.2 volts, is applied to the lead 54 through the diode 118. This establishes a minimum voltage at the Y input of the differential amplifier 69 (see FIG. 2). When, however, voltage supplied to the Y input of amplifier 69 from the speed and position sensor 26 exceeds the voltage at the cathode of diode 118, the diode 118 is rendered non-conductive and has no further effect upon the circuit so long as these conditions prevail. It should be apparent that the circuit within the box 175 establishes the minimum ground speed of the vehicle at which the control circuit 27 will be brought into operation to open the flow control valve 110 by means of the regulating means 28 with concomitant driving of the feed mechanism 12. When the vehicle speed drops below this predetermined minimum, the flow control valve 110 will be closed to stop operation of the speed mechanism 12. As with the embodiment of FIG. 2, independent operation of the hopper gate 11 is required both open and close same.

In the systems described with reference to FIGS. 2 and 3 control of the hopper gate is left to the judgment of the operator of the vehicle. Where the speed regulatable driver 29 is in the form of an internal combustion engine, it may not be operated within an optimum range of speeds. The same may be true of operation of the hydraulic motor driver of FIG. 3. This drawback can be overcome by resorting to the automatic control illustrated in FIG. 4 to which attention is now directed. Basically, the system shown in FIG. 4 differs from the system in FIG. 2 by virtue of the inclusion of a sensing network shown within the outline box 119, a switching arrangement shown within the outline box 120, and an electrically operable position actuator for the regulating means 31.

Figure 4:
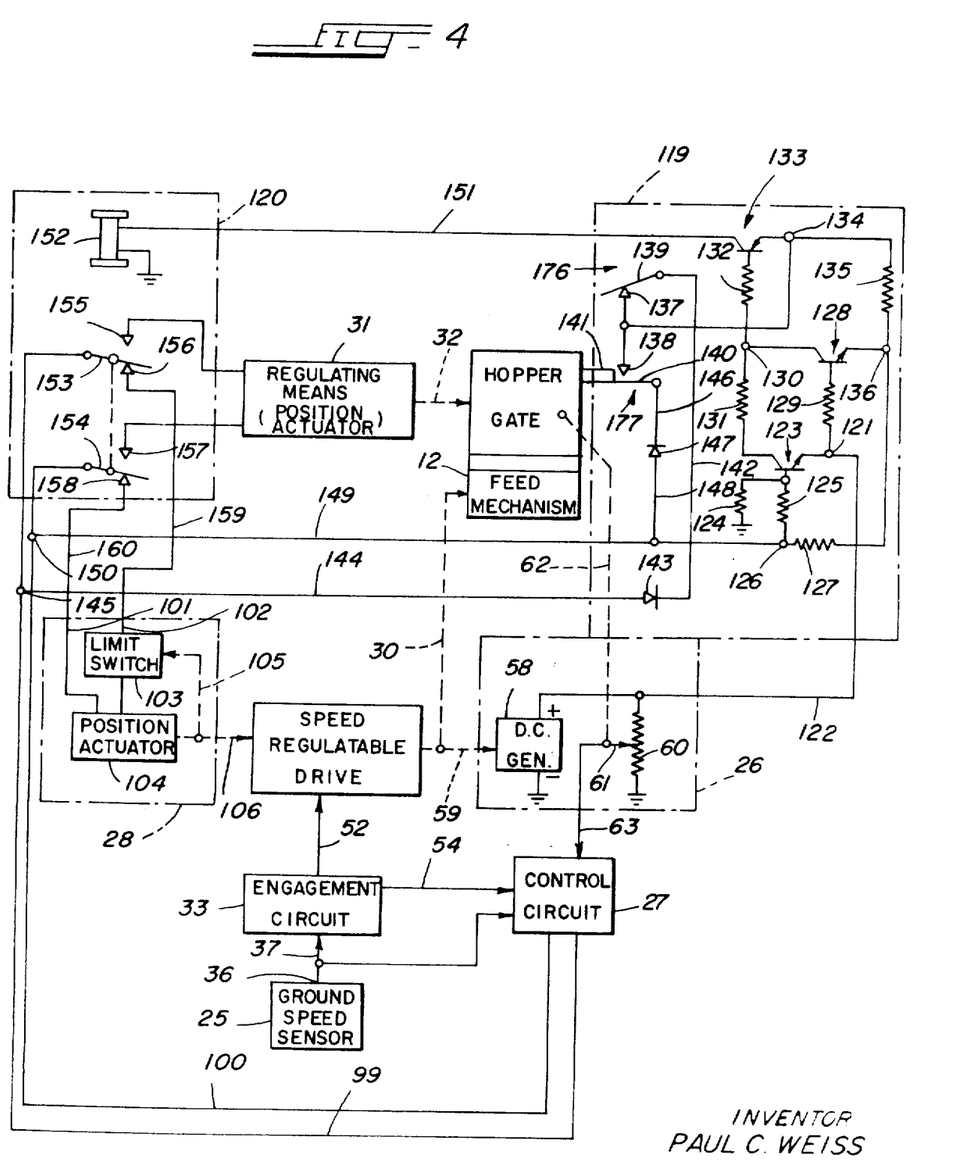
FIG. 4 is a schematic diagram of a system representing a modification of the system of FIG. 2 and employing an arrangement for controlling both the hopper gate and the feed mechanism in response to ground speed.

The sensing network 119 comprises an input terminal 121 which is interconnected with the speed and position sensor 26 by a conductor 122 leading to the output of the speed sensing component at the junction between the potentiometer 60 and the generator 58. The terminal 121 is connected to the emitter electrode of an N-P-N transistor 123 which has its base electrode connected through a resistor 124 to ground and through a resistor 125 to a junction 126. The junction 126 is connected through a resistor 127 to the emitter electrode of another N-P-N transistor 128 whose base electrode is connected through a resistor 129 to the terminal 121 and whose collector electrode is connected to the junction 130 between resistors 131 and 132. The free end of resistor 131 is connected to the collector electrode of transistor 123. The free end of resistor 132 is connected to the base electrode of a P-N-P transistor 133 whose emitter electrode is connected to a junction 134. Junction 134 is connected through a resistor 135 to the junction 136 between the resistor 127 and the emitter electrode of transistor 128. The junction 134 is also connected to a pair of fixed contacts 137 and 138 associated with respective armatures 139 and 140. The armature 139 with contact 137 constitutes a limit switch 176 defining the upper limit of movement of hopper gate 11 and is opened when engaged by the arm extension 141 from the hopper gate. Similarly, a lower limit is defined by limit switch 177 formed by armature 140 and contact 138.

Armature 139 is connected by a lead 142 to the cathode of a diode 143 whose anode is connected by a lead 144 to a junction 145 with the conductor 99 at the output of the control circuit 27. The armature 140 of the lower limit switch 177 is connected through a conductor 146 to the cathode of a diode 147 whose anode is connected through a conductor 148 to a lead 149 interconnecting the junction point 126 with the lead 100 at a junction 150.

The collector electrode of transistor 133 is connected over a lead 151 from the output of the sensing network 119 to the input of the switching arrangement 120 and through the solenoid 152 located therein to ground. Solenoid 152 actuates the armatures 153 and 154 in unison. Armature 153 cooperates with fixed contacts 155 and 156 while armature 154 cooperates with fixed contacts 157 and 158.

Assuming that the regulating means 31 takes the form of an electric motor, its input terminals are connected to the contacts 155 and 157 in the switching arrangement 120. The contact 156 is connected over a lead 159 to the input point 102 of the regulating means 28. The contact 158 is connected over a lead 160 to the input point 101 of regulating means 28. Armatures 153 and 154 are connected, respectively, to junction points 145 and 150. The details of the ground speed sensor 25, the control circuit 27, the speed regulatable driver 29, and the engagement circuit 33 are the same as those already described with reference to FIG. 2.

It will be seen from FIG. 4 that with the solenoid 152 deenergized and the armatures 153 and 154 in the positions shown, the output from the control circuit 27 is applied through the contacts 156 and 158 to the input to the regulating means 28. When the solenoid 152 is energized actuating the armatures 153 and 154 to the opposite contacts 155 and 157, the output from the control circuit 27 is applied to the input to the regulating means 31.

Referring to FIG. 2, it will be noted that the output leads 99 and 100 receive voltage only when the corresponding output relay 76 or 88 of the control circuit 27 is energized. It will be helpful in following the operation of the system shown in FIG. 4 if it is borne in mind that potential on the output lead 99 effects an increase in the rate of feed of material while potential on the output lead 100 effects a decrease in the rate of material feed. So long as both leads 99 and 100 are at ground potential, the sensing network 119 will be inoperative and the solenoid 152 in the switching arrangement 120 will be deenergized. The output from the control circuit 27 will, therefore, be connected to the regulating means 28.

The transistor 133 is supplied with current either through the diode 143 and the limit switch 176 when the control circuit 27 is calling for an increased output, or through diode 147 and limit switch 177 when the control circuit 27 is calling for a decrease in material feed. When an increase in feed is demanded, the lead 149 will be grounded while the lead 144 will be at the potential of the positive voltage source. Current will flow through diode 143, closed limit switch 176, junction 134, resistor 135, resistor 127 to ground.

For the purpose of discussion, assume that the potential on the lead 144 is 14.5 volts and the potential at junction 136 is approximately 10 volts. If the potential at the input terminal 121, representing the output voltage of the generator 58, exceeds the voltage at junction 136, the transistor 128 will be rendered conductive. This decreases the potential at the base electrode of transistor 133 rendering that transistor conductive and energizing the solenoid 152 in the switching network 120 to switch the output leads from the control circuit 27 to the input to the regulating means 31. If there is further demand for increased feed evidenced by a positive voltage on the output lead 99 from the control circuit 27, the regulating means 31 will be actuated to open the hopper gate continuing to open same until either a balanced condition develops within the control circuit 27 or the hopper gate reaches its upper limit opening the limit switch 176.

If limit switch 176 opens, control is returned to the regulating means 28 and still further demand for increase will actuate the regulating means 28 further increasing the speed of the speed regulatable driver 29 until the limit switch 103 opens. When the demand changes to one calling for a decrease the output lead 100 will be at positive potential while the lead 99 will be grounded. This applies the full positive potential, for example 14.5 volts, to the lead 149 and to the junction point 126. Hence, the potential at junction 136 rises to approximately 14.5 volts. This renders transistor 128 non-conductive. At the same time, a circuit exists from the point 126 through resistors 125 and 124 to ground which establishes a predetermined low voltage, for example 6 volts, at the base electrode of transistor 123. Since the speed regulatable driver 29 is operating at top speed the output from generator 58, which is supplied over lead 122 to input point 121, will be at some maximum level. Thus, transistor 123 will also be non-conducting. This condition prevails until the voltage at the output of generator 58 drops to a level below the voltage appearing at the base electrode of transistor 123. In this example, when the output of the generator 58 drops below 6 volts the transistor 123 will be rendered conductive permitting transistor 133 to conduct and energize winding 152. It must be remembered that the lower limit switch 177 is closed and that current is supplied to transistor 133 through diode 147 from the lead 149.

When the voltage output from the speed sensing generator 58 falls below the predetermined low reference level established by circuit 119, the control circuit 27 is reconnected to the regulating means 31 for the hopper gate 11. Further demand for decrease will cause the hopper gate to close until the lower limit switch 177 is opened. Upon this occurring, control will be transferred again to the regulating means 28 for further reducing the speed of the speed regulatable driver 29 until the limit switch 103 opens. It will thus be seen that selection of appropriate circuit constants for the sensing network 133 so as to establish desired voltage levels at junction 136 and at the base electrode of the transistor 123 will cause the control of the rate of material discharge to be handled by the feed mechanism 12 so long as the speed regulatable driver 29 is operating within predetermined limits. If the speed of the driver 29 either falls below or exceeds a predetermined range, control will be transferred to the hopper gate within its operating limits. Where the speed regulatable driver is an internal combustion engine, as shown in Flg. 2, it can be operated within its optimum speed range for a wide range of material delivery rates.

The operation of the ground speed sensor 25 and engagement circuit 33 along with the control circuit 27 in FIG. 4 is the same as that previously described in conjunction with FIG. 2. Thus, when the vehicle is halted the engagement circuit 33 becomes deenergized causing the electric clutch to disengage, stopping operation of the feed mechanism 12. At the same time a voltage is fed over the connection 54 to the control circuit which results in a decrease or positive signal appearing on output lead 100. The generator 58 will be halted providing a low resistance path between the lead 122 and ground. The transistors 123 and 133 will be rendered conductive energizing the switching arrangement 120 so as to apply the decrease signal to the regulating means 31 closing the hopper gate until the lower limit switch 177 is opened. Upon this occurrence, the winding 152 will be deenergized returning the output from control circuit 27 to the regulating means 28 causing it to operate until limit switch 103 opens with the speed regulatable driver 29 in its idling condition.

Closing the hopper gate 11 is important with many materials such as dry sand and the like because such materials will continue to flow through the gate opening even though the conveyor has stopped. However, as noted above, the gate is never fully closed, remaining open approximately 5 percent. This is closed enough to prevent the discharge of even dry sand when the feed mechanism is not operating.

A typical speed range for an internal combustion engine as used in the speed regulatable driver is between 1,500 and 2,500 RPM. To accommodate that range it will be found convenient to employ for the generator 58 one capable of developing 4 volts per 1,000 RPM. This means that the generator output will be approximately 6 volts at 1,500 RPM and approximately 10 volts at 2,500 RPM. The significance of the voltages mentioned previously in describing the sensing network 119 should now be evident.

Figure 5:
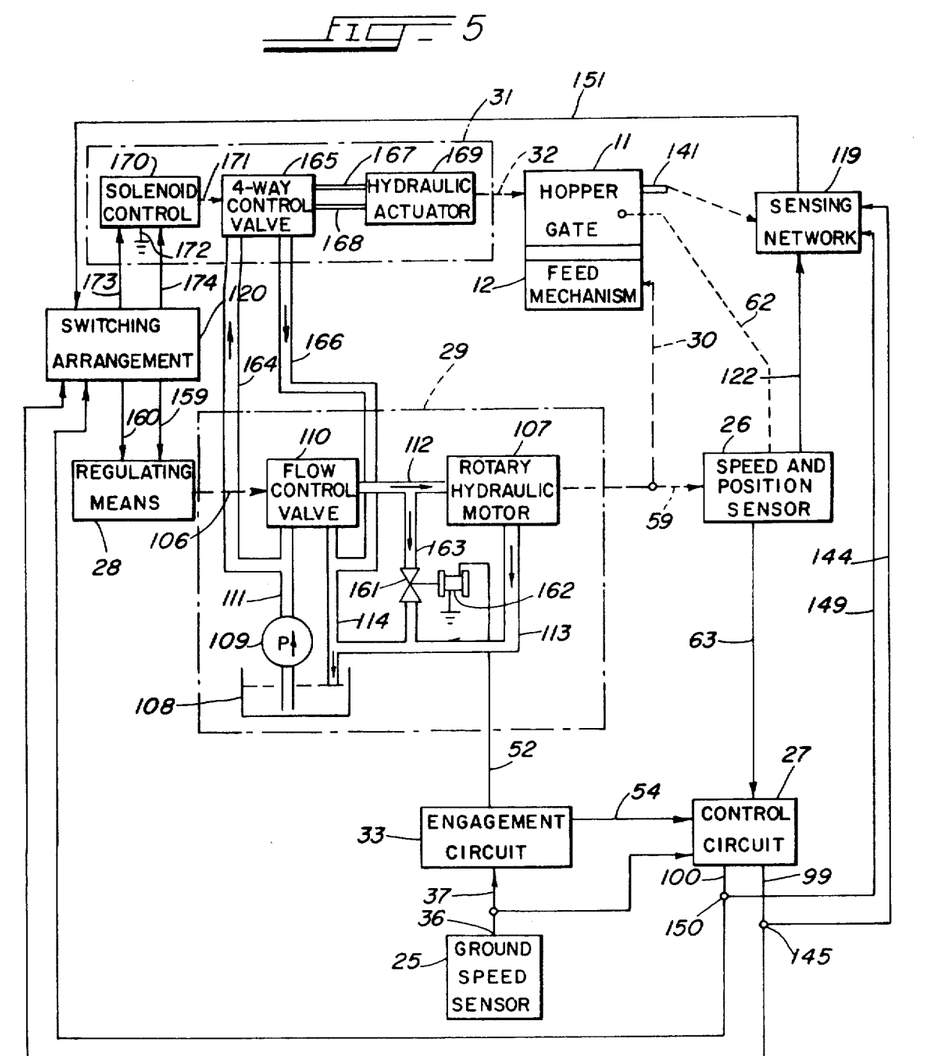
FIG. 5 is a schematic diagram showing a modification of the system of FIG. 4.

In the system shown in FIG. 4, the hopper gate 11 is adjusted by an electrically operated motor or position actuator 31, while the speed regulatable driver 29 has been described as being in the form of an internal combustion engine. However, a similar arrangement can be provided employing hydraulic controls. This modification is shown in FIG. 5. The construction and operation of the ground speed sensor 25, speed and position sensor 26, control circuit 27, regulating means 28, engagement circuit 33, sensing network 119, switching arrangement 120, along with hopper gate 11 and feed mechanism 12 is substantially the same as described with reference to the previous embodiments. The speed regulatable driver, however, may be similar to that shown in FIG. 3. Thus, in FIG. 5 power is developed by the rotary hydraulic motor 107 controlled by the flow control valve 110. The arrangement differs from that of FIG. 3 by the provision of a normally opened valve 161 controlled by a solenoid 162 having one end of its winding grounded, while the other end is connected to the output lead 52 from the engagement circuit 33. The valve 161 is connected in series with a shunt conduit 163 between the conduits 112 and 113. When the valve 161 is open hydraulic fluid is bypassed around the rotary hydraulic motor 107 rendering it inoperative. When the valve 161 is closed upon energization of solenoid 162, fluid from flow control valve 110 passes through and causes operation of rotary hydraulic motor 107. This arrangement provides for more rapid halting of the operation of the feed mechanism 12 than can be obtained with the arrangement shown in FIG. 3.

In addition, fluid from the pump 109 is fed through a supply conduit 164 to a four-way control valve 165 within the regulating means 31. Return fluid from the four-way control valve 165 passes through a conduit 166 back to the return conduit 114 leading to the reservoir 108. Controlled fluid from the valve 165 is supplied through conduits 167 and 168 to an hydraulic actuator 169 in the regulating means 31. The actuator 169 may be a hydraulic cylinder mechanically coupled over the path 32 to operate the hopper gate 11.

For the purpose of controlling the valve 165 there is provided a solenoid control 170 having a mechanical output 171 which is coupled to the valve actuator in known manner. The solenoid control 170 will have two solenoids, one for operating the valve 165 in a direction to open the hopper gate 11 while the other will operate the valve 165 in a direction to close the hopper gate 11. The solenoids may have a common connection to ground through the lead 172 while their free ends are respectively connected to the leads 173 and 174 communicating with the switching arrangement 120. The lead 173 may be joined to the contact 155 while the lead 174 may be joined to the contact 157 in the switching arrangement 120 as shown in FIG. 4.

Since the hydraulic motor 107 will typically operate at a slower speed than the internal combustion engine, for example 200 to 800 RPM as a normal range with 0 and 1,200 RPM as extreme limits, the generator 58 within the speed and position sensor 26 should, preferably, have a characteristic developing 10 volts per 1,000 RPM. The sensing network 119 would have its resistances altered such that the potential at junction 136 is about 8 volts during an increasing demand mode and the potential at the base of transistor 123 will be approximately 2 volts during a decreasing demand mode. This voltage change is brought about by increasing the value of resistor 135 and decreasing the value of resistor 124. If desired, these resistors could be made adjustable for increased flexibility. In all other respects, the operation of the system of FIG. 5 is the same as that described with reference to the system of FIG. 4.

In those cases where a somewhat slower shut down time is acceptable, the engagement circuit 33 and the solenoid valve consisting of elements 161 and 162 can be eliminated. A biasing circuit 175 as shown in FIG. 3 can be substituted with its output connected to the Y input of the differential amplifier 69 (see FIG. 2). Thus, with no signal from the ground speed sensor 25, the control circuit 27 would remain actuated causing a decrease signal to appear on lead 100.

With the hydraulic control arrangement of FIG. 5 and the increased flexibility obtained due to the dual control of the discharge of material, it is possible to make use of smaller fluid pumps, and lower pressure hose connections in conjunction with the fluid circuit for operating the hydraulic motor 107 as well as the hydraulic actuator 169.

In describing the various embodiments above, only passing mention was made of the magnitude of the supply voltage. Generally, this voltage will be approximately 14.5 volts as normally available on a motor vehicle. This voltage will, as is well known, vary with the typical ignition system employed and with voltage fluctuations.

It is to be understood that the electric clutch described with reference to FIG. 2 may take the form of any electrically controllable clutch mechanism. The DC generators 34 and 58 may be conventional tachometer generators.

It should be evident from the foregoing discussion that the present invention provides for extreme flexibility in the control of material discharging apparatus, particularly by virtue of its provision for optimum utilization of two interdependent discharge determining components, to wit: the position regulatable hopper gate and the speed regulatable conveyor or auger feed mechanism.

From the standpoint of the operation of the systems of FIGS. 4 and 5, the limit switches 176 and 177 provide means for inhibiting the actuation of the switching arrangement whenever the position regulatable component would be required to move beyond the limiting positions determined thereby. With respect to the speed and position sensor 26, the output from slider 61 to lead 63 may be considered as corresponding to the product of the speed of the speed regulatable component (the feed mechanism 12) multiplied by the fractional position of the position regulatable component (the hopper gate 11).

For the purpose of illustration only, and without any intention of limiting the disclosure the following values are suggested for the various resistors and potentiometers in the several embodiments. Each element is identified by its reference numeral. In connection with the resistors 124 and 135 the value set forth within parentheses will provide the 2-bolt and 8-bolt limits while the value without parentheses provides the 6-volt and 10-volt limits. Also listed are typical transistor types.

RESISTORS AND POTENTIOMETERS

| Ref. No. | Ohms | Ref. No. | Ohms | Ref. No. | Ohms |
|---|---|---|---|---|---|
| 19 | 5 K ** | 66 | 5 K ** | 116 | 22 |
| 22 | 5 K ** | 67 | 2.5 K * | 124 | 2.7 K |
| 23 | 2.5 K * | 71 | 5 K ** | (124) | (680) |
| 38 | 4.7 K | 72 | 2.5 K * | 125 | 3.9 K |
| 41 | 1 K ** | 73 | 2.5 K * | 127 | 1 K |
| 44 | 4.7 K | 80 | 1.5 K | 129 | 2.2 K |
| 45 | 4.7 K | 82 | 68 | 131 | 2.2 K |
| 53 | 3.9 K | 93 | 1.5 K | 132 | 470 |
| 60 | 5 K | 94 | 68 | 135 | 470 |
| 64 | 4.7 K | 115 | 1.5 K | (135) | (680 |

$K = \times 10^3$
* = Adjustable
** = Potentiometer

TRANSISTORS

| Ref. No. | | Ref. No. | Type |
|---|---|---|---|
| 39 | 2N1302 | 95 | 2N555 |
| 46 | 2N555 | 123 | 2N1302 |
| 65 | 2N1304 | 128 | 2N1302 |
| 83 | 2N555 | 133 | 2N555 |

Having described the invention with reference to various preferred embodiments thereof, it will be understood that numerous changes may be made in the details of construction without departing from the true spirit of the invention as defined in the appended claims.

What is claimed is:

1. Apparatus for controlling the operation of a vehicular material spreader of the type having a reservoir from which material is dispensed at a rate determined by at least two interdependent discharge determining components having respective means for regulating a corresponding discharge determining characteristic thereof, said apparatus comprising in combination: means for sensing the ground speed of the vehicular spreader, means for sensing the prevailing discharge determining characteristics of said two components, a control circuit responsive to both of said sensing means for effecting an adjustment of a discharge determining characteristic regulating means as a function of change in ground speed, and means for selectively coupling said control circuit operatively to one or the other of said regulating means such that regulation is accomplished with one regulating means so long as it operates within a given optimum range and is transferred to the other regulating means within its capability whenever said one regulating means is adjusted to an end of said optimum range and the adjustment called for would require said one regulating means to depart from said optimum range.

2. Apparatus according to claim 1, wherein the two discharge determining components are position regulatable and speed regulatable, respectively, and the means for sensing the prevailing discharge determining characteristics comprise means for sensing the speed of said speed regulatable component, and means for sensing the position of said position regulatable component.

3. Apparatus according to claim 2, wherein said speed sensing means comprises a tachometer generator and means for driving said generator at a speed proportional to the speed of said speed regulatable component, wherein said position sensing means comprises a potentiometer and means for adjusting said potentiometer as a function of the adjustment of said position regulatable component, and wherein said potentiometer is coupled to an output of said generator such that the output of the potentiometer corresponds to the product of the speed of said speed regulatable component multiplied by the fractional position of said position regulatable component.

4. Apparatus according to claim 3, wherein said means for selectively coupling said control circuit comprises a sensing network coupled to an output of said generator, and a switching arrangement under the control of said sensing network, said switching arrangement being coupled to an output of said control circuit and having means for interconnecting said control circuit output selectively in a first operating mode to said regulating means for the speed regulatable component, and in a second operating mode to said regulating means for the position regulatable component, said sensing network being arranged for maintaining the switching arrangement in said first operating mode so long as the output from said generator remains within predetermined limits and for normally actuating said switching arrangement to its second operating mode when the output from said generator goes beyond said limits.

5. Apparatus according to claim 4, wherein means are provided for inhibiting the actuation of said switching arrangement from said first to said second mode when said position regulatable component would be required to move beyond predetermined maximum and minimum positions.

6. Apparatus according to claim 5, wherein said minimum position corresponds to a discharge rate greater than zero.

7. Apparatus according to claim 3, wherein said means for sensing the ground speed comprises a second tachometer generator and means for driving the second generator at a speed proportional to the ground speed of the vehicular spreader; and wherein said control circuit comprises means for comparing the voltage from said second generator with the output from said potentiometer, and means for controlling said regulating means in a direction tending to maintain a fixed relation between the output from said potentiometer and said voltage.

8. Apparatus according to claim 7, wherein said control circuit further comprises means operative when the voltage from said second generator is below a given value to apply to said comparing means a fixed voltage signal for causing both of said regulating means to be adjusted to respective limiting conditions to provide zero discharge.

9. Apparatus according to claim 7, wherein said control circuit comprises means for automatically adjusting both of said regulating means to respective limiting conditions to provide zero discharge when the ground speed is below a predetermined minimum magnitude.

10. Apparatus for controlling the operation of a vehicular material spreader of the type having a reservoir from which material is dispensed under the mutual control of a position adjustable gate and an adjustable speed feed mechanism, said apparatus comprising in combination: means for sensing the ground speed of the vehicular spreader, means for sensing the speed of said feed mechanism, means for sensing the position of said gate, a control circuit responsive to all of said sensing means, motor means for driving said feed mechanism, means for regulating the speed of said motor means, means for adjusting the position of said gate, and means for selectably coupling said control circuit operatively to one or the other of said two last mentioned means for adjusting said speed or position, respectively, as a function of change in ground speed with said control circuit being coupled to said speed regulating means so long as said motor means operates within a given optimum range and being transferred to said position adjusting means so long as it is capable of being adjusted whenever said motor means is adjusted to an end of said optimum range and the adjustment called for would require said motor means to depart from said optimum range.

11. The method of operating a vehicular spreader, of the type having a reservoir from which the discharge of material is controlled by both the positioning of a gate and the regulation of the speed of a feed mechanism, which comprises the steps of starting the feed mechanism at a below optimum speed with the gate slightly open at a minimum limit when the speed of the spreader reaches a first magnitude; and thereafter, for all faster speeds of said spreader up to a limiting maximum, regulating the rate of material discharge as a function of said spreader speed by regulating the speed of said feed mechanism or positioning said gate, with control being effected exclusively by said gate: (a) when a decreasing demand occurs, the gate is open more than its minimum limit, and the feed mechanism is operating at the lower end of its optimum speed range; and (b) when an increasing demand occurs, the gate is not fully open, and the feed mechanism is operating at the upper end of its optimum speed range; and control being effected by regulating the speed of said feed mechanism at all other times.

12. Apparatus for controlling the operation of a vehicular material spreader of the type having a reservoir from which material is dispensed at a rate determined by at least two interdependent discharge determining components having respective means for regulating a corresponding discharge determining characteristic thereof, said apparatus comprising, in combination: means for sensing the ground speed of the vehicular spreader; means for sensing the prevailing discharge determining characteristics of said two components; a control circuit responsive to both of said sensing means for effecting as a function of change in ground speed an adjustment of one of said means for regulating a discharge determining characteristic; and means for adjusting the other of said regulating means for maintaining the operation of said one regulating means within a desired range; the adjustment of said one of said regulating means being restricted to a range having predetermined end limits; and signal means coupled to said control circuit for indicating when one of said end limits is reached whereby the other of said regulating means can be adjusted to return said one regulating means to an intermediate point in said range.

13. Apparatus for controlling the operation of a vehicular material spreader of the type having a reservoir from which material is dispensed at a rate determined by at least two interdependent discharge determining components having respective means for regulating a corresponding discharge determining characteristic thereof, said apparatus comprising, in combination: means for sensing the ground speed of the vehicular spreader; means for sensing the prevailing discharge determining characteristics of said two components; a control circuit responsive to both of said sensing means for effecting as a function of change in ground speed an adjustment of one of said means for regulating a discharge determining characteristic; means for adjusting the other of said regulating means for maintaining the operation of said one regulating means within a desired range; the adjustment of said one of said regulating means being restricted to a range having predetermined end limits; signal means coupled to said control circuit for indicating when one of said end limits is reached, whereby the other of said regulating means can be adjusted to return said one regulating means to an intermediate point in said range; said one of said regulating means comprising an electrically operable motor means for effecting the adjustment thereof and a limit switch; said limit switch being connected electrically in series with said motor means to provide a series circuit and being coupled mechanically to said motor means for actuation thereby to open said series circuit when said end limits are reached; and said control circuit comprising an impedance element; means coupling said impedance element in series with said series circuit for connection to a source of electric current; switch means having two operative conditions; means coupling said switch means across said series circuit for shunting said series circuit when said switch means is in one condition and for removing said shunt when said switch means is in the other condition; and means for coupling said signal means to said impedance element for causing said signal means in response to the absence of a voltage drop across said impedance element to indicate when said switch means is in said other condition and said limit switch is simultaneously open circuited.

14. Apparatus for controlling the operation of a vehicular material spreader of the type having a reservoir from which material is dispensed under the mutual control of position adjustable gate and an adjustable speed feed mechanism, said apparatus comprising, in combination: means for sensing the ground speed of the vehicular spreader; means for sensing the speed of said feed mechanism; means for sensing the position of said gate; a control circuit responsive to all of said sensing means; motor means for driving said feed mechanism; first regulating means for regulating the speed of said motor means; second regulating means for adjusting the position of said gate; means for coupling said control circuit operatively to one of said regulating means for controlling the latter as a function of change in ground speed such that material is dispensed at a desired rate independent of adjustment of the other regulating means; said control circuit being coupled to said first regulating means; means coupled to said control circuit and arranged to maintain the feed mechanism inoperative when the ground speed of the vehicular spreader is below a predetermined minimum value; said motor means comprising a fluid motor with a flow control valve for adjusting its speed; and said means for maintaining the feed mechanism inoperative comprising means coupled to said control circuit causing said flow control valve to close when said ground speed is below said minimum value.

15. Apparatus for controlling the operation of a vehicular material spreader of the type having a reservoir from which material is dispensed under the mutual control of a position adjustable gate and an adjustable speed feed mechanism, said apparatus comprising, in combination: means for sensing the ground speed of the vehicular spreader; means for sensing the speed of said feed mechanism; means for sensing the position of said gate; a control circuit responsive to all of said sensing means; motor means for driving said feed mechanism; first regulating means for regulating the speed of said motor means; second regulating means for adjusting the position of said gate; means for coupling said control circuit operatively to one of said regulating means for controlling the latter as a function of change in ground speed such that material is dispensed at a desired rate independent of adjustment of the other regulating means; said control circuit being coupled to said first regulating means; and means coupled to said control circuit and arranged to maintain the feed mechanism inoperative when the ground speed of the vehicular spreader is below a predetermined minimum value; said means for maintaining the feed mechanism inoperating comprising a clutch mechanism for coupling said motor means to said feed mechanism; and means interconnecting said clutch mechanism with said means for sensing the ground speed for disengaging said clutch mechanism when said ground speed is below said minimum value.

16. Apparatus for controlling the operation of a vehicular material spreader of the type having a reservoir from which material is dispensed under the mutual control of a position adjustable gate and an adjustable speed feed mechanism, said apparatus comprising, in combination: means for sensing the ground speed of the vehicular spreader; means for sensing the speed of said feed mechanism; means for sensing the position of said gate; a control circuit responsive to all of said sensing means; motor means for driving said feed mechanism; first regulating means for regulating the speed of said motor means; second regulating means for adjusting the position of said gate; means for coupling said control circuit operatively to one of said regulating means for controlling the latter as a function of change in ground speed such that material is dispensed at a desired rate independent of adjustment of the other regulating means; said control circuit being coupled to said first regulating means; means are coupled to said control circuit and arranged to maintain the feed mechanism inoperative when the ground speed of the vehicular spreader is below predetermined minimum value; said means for maintaining the feed mechanism inoperative comprising a clutch mechanism for coupling said motor means to said feed mechanism; means interconnecting said clutch mechanism with said means for sensing the ground speed for disengaging said clutch mechanism when said ground speed is below said minimum value; said motor means comprising an internal combustion engine; and means interconnecting said means for sensing the ground speed with said control circuit for causing said engine to idle when said ground speed is below said minimum valve.

* * * * *